United States Patent [19]

Hieatt, III

[11] Patent Number: 5,535,215

[45] Date of Patent: Jul. 9, 1996

[54] METHOD AND APPARATUS FOR PROVIDING CONTROL CHANNELS AND MESSAGE CHANNELS IN A RADIO COMMUNICATION SYSTEM

[75] Inventor: William R. Hieatt, III, Colleyville, Tex.

[73] Assignee: Motorola, Inc., Schaumburg, Ill.

[21] Appl. No.: 432,352

[22] Filed: May 1, 1995

[51] Int. Cl.$^6$ ................................ H04J 3/16; H04J 4/00
[52] U.S. Cl. ............... 370/95.1; 370/105.2; 370/110.1; 455/33.1; 455/51.2; 455/54.1; 455/70; 375/219; 375/295; 379/59; 379/63
[58] Field of Search .......................... 370/85.7, 95.1, 370/95.2, 95.3, 100.1, 105.2, 110.1; 455/33.1, 38.3, 51.1, 51.2, 53.1, 54.1, 68, 70, 102, 103, 108, 109; 379/57, 58, 59, 63; 375/219, 295, 300, 303; 340/825.03

[56] References Cited

U.S. PATENT DOCUMENTS

| | | | |
|---|---|---|---|
| 4,875,038 | 10/1989 | Siwiak et al. | 340/825.44 |
| 5,121,391 | 6/1992 | Paneta et al. | 370/95.1 |
| 5,218,717 | 6/1993 | Reitberger | 455/51.2 |
| 5,276,686 | 1/1994 | Ito | 370/95.1 |
| 5,355,367 | 10/1994 | Comroe et al. | 370/95.1 |
| 5,404,573 | 4/1995 | Yabe et al. | 455/33.1 |
| 5,434,904 | 7/1995 | Pegnet et al. | 370/95.1 |

*Primary Examiner*—Alpus H. Hsu
*Assistant Examiner*—Rickey Q. Ngo
*Attorney, Agent, or Firm*—Charles W. Bethards

[57] ABSTRACT

A method and apparatus in a radio communication system (100, 101) provides simulcast control channels for a coverage area (500), and message channels transmitted in coverage zones (502) within the coverage area (500) on a time-division multiplex basis (FIG. 4). A first modulation technique generates (814, 816, 818) each of the message channels at a first average output power substantially less than a peak output power of a transmitter (202). A second modulation technique generates (806, 808, 810) each of the control channels at a second average output power approximately equal to the peak output power of the transmitter (202), thereby increasing usable coverage distance from the transmitter (202) for the control channel compared to the message channel. The control channels are allocated (FIG. 5) to the coverage zones (502) in a staggered geographic pattern such that reception of the control channels is maintained substantially throughout the coverage area (500).

16 Claims, 6 Drawing Sheets

METHOD AND APPARATUS FOR PROVIDING CONTROL CHANNELS AND MESSAGE CHANNELS IN A RADIO COMMUNICATION SYSTEM

RELATED APPLICATION

U.S. patent application Ser. No. 08/413,020, filed Mar. 29, 1995, by Segal et al., entitled "Method and Apparatus for Processing a Voice Message Intended for a Selective Call Transceiver," now pending.

FIELD OF THE INVENTION

This invention relates in general to radio communication systems, and more specifically to a method and apparatus for providing control channels and message channels in a radio communication system.

BACKGROUND OF THE INVENTION

In a radio communication system utilizing multiple channels for transmitting voice messages to portable receivers there are two basic types of information sent to the portable receivers: voice message information, and control information such as a channel assignment for receiving a voice message. Preferably, the control information is simulcast throughout the coverage area so that idle portable receivers are not required to have their locations tracked by the system. Preferably, the voice messages are broadcast from transmitters in localized coverage zones within the coverage area, so that traffic capacity can be increased through frequency re-use.

A problem with simulcast transmission of the control information throughout the coverage area is that as the coverage area increases in capacity, multiple control channels are required to handle the resultant control information traffic. Operating multiple control channels from every coverage zone transmitter is not a feasible solution, however, due to high bandwidth requirements and associated high cost.

What is needed is a cost effective method and apparatus for simulcasting the control information on multiple channels throughout the coverage area without requiring the multiple control channels to be transmitted from every coverage zone transmitter. Preferably, the method and apparatus should not require any additional transmitters beyond those required for sending the voice message information.

DESCRIPTION OF THE PREFERRED EMBODIMENT

Figure 1:
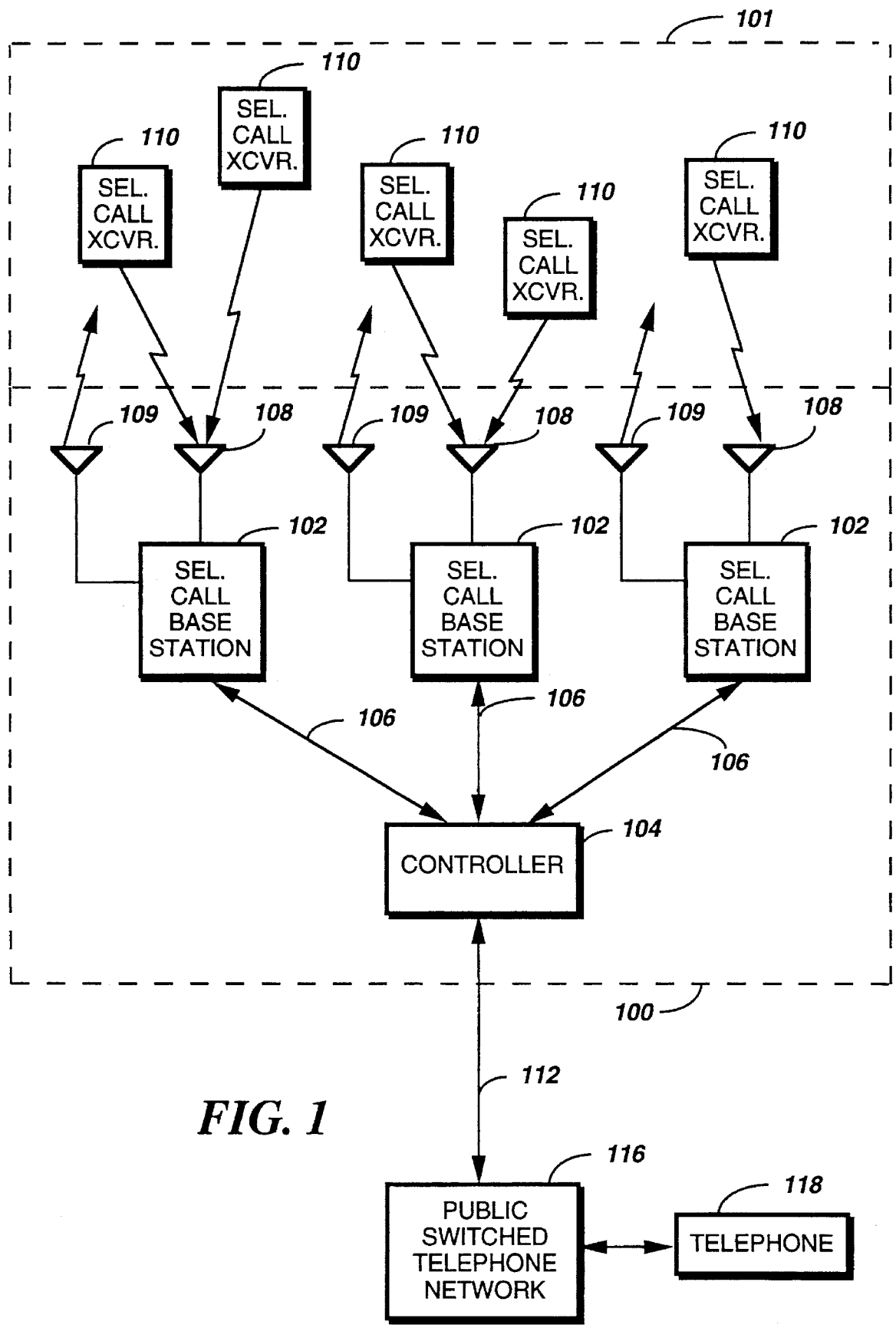
FIG. 1 is an electrical block diagram of a radio communication system in accordance with the preferred embodiment of the present invention.

Referring to FIG. 1, an electrical block diagram of a radio communication system in accordance with the preferred embodiment of the present invention comprises a fixed portion 100 and a portable portion 101. The fixed portion 100 comprises a plurality of conventional selective call base stations 102 coupled by communication links 106 to a controller 104 for controlling the selective call base stations 102. The hardware of the controller 104 is preferably similar to the MPS 2000™ paging control center manufactured by Motorola, Inc. of Schaumburg, Ill. Other similar controller hardware can be utilized as well for the controller 104. The controller 104 comprises modulation and channel allocation control firmware elements in accordance with the preferred embodiment of the present invention, as will be described further below.

Each of the selective call base stations 102 transmits radio signals to the portable portion 101 comprising a plurality of selective call transceivers 110 via a transmitting antenna 109. The selective call base stations 102 each receive radio signals from the plurality of selective call transceivers 110 via a receiving antenna 108. The radio signals comprise selective call addresses and messages transmitted to the selective call transceivers 110 and acknowledgments received from the selective call transceivers 110. It will be appreciated that the selective call transceivers 110 can also originate messages other than acknowledgments. The controller 104 preferably is coupled to the public switched telephone network (PSTN) 116 by telephonic links 112 for receiving selective call originations therefrom. Selective call originations comprising voice messages from the PSTN 116 can be generated, for example, from a conventional telephone 118 coupled to the PSTN 116 in a manner that is well known in the art. It will be appreciated that other types of messages, e.g., alphanumeric messages, can also be generated from appropriate terminal devices.

Control information transmissions between the selective call base stations 102 and the selective call transceivers 110 preferably are transmitted as a simulcast signal throughout a coverage area served by the radio communication system utilizing a well-known digital selective call signaling protocol, such as the Motorola FLEX™ protocol. It will be appreciated that other protocols such as the Golay Sequential Code (GSC) or Motorola's new REFLEX™ and InFLEXion™ protocols can be utilized as well. These protocols utilize well-known error detection and error correction techniques and are therefore tolerant to bit errors occurring during transmission, provided that the bit errors are not too numerous in any one code word.

Voice message transmissions preferably utilize a conventional analog single sideband amplitude modulation (SSB AM) transmission mode to conserve bandwidth. To further conserve bandwidth, a voice message transmission preferably is targeted, in a manner well known in the art, to a single coverage zone within the coverage area by determining the location of the selective call transceiver 110 for which the message is intended. This allows frequency re-use throughout the coverage area for transmitting additional voice messages in a manner similar to the frequency re-use employed in cellular telephone systems.

Preferably, the control information and the voice messages are transmitted on a time-division multiplex (TDM) basis synchronized throughout the coverage area. The transmissions are divided into a plurality of time frames, a time frame for the control information being followed by several time frames for voice messages, as described further below.

Forward channel (outbound) transmissions comprising the control information from the selective call base stations 102 preferably utilize four-level frequency shift keyed (FSK) modulation, operating at sixteen-hundred or thirty-two-hundred symbols-per-second (sps), depending on traffic requirements and system transmission gain. Reverse channel transmissions from the selective call transceivers 110 to the selective call base stations 102 preferably utilize binary FSK modulation at a rate of eight-hundred bits per second (bps). Reverse channel transmissions preferably occur during predetermined data packet time slots synchronized with the forward channel transmissions. It will be appreciated that, alternatively, other signaling protocols, modulation schemes, and transmission rates can be utilized as well for either or both transmission directions. U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
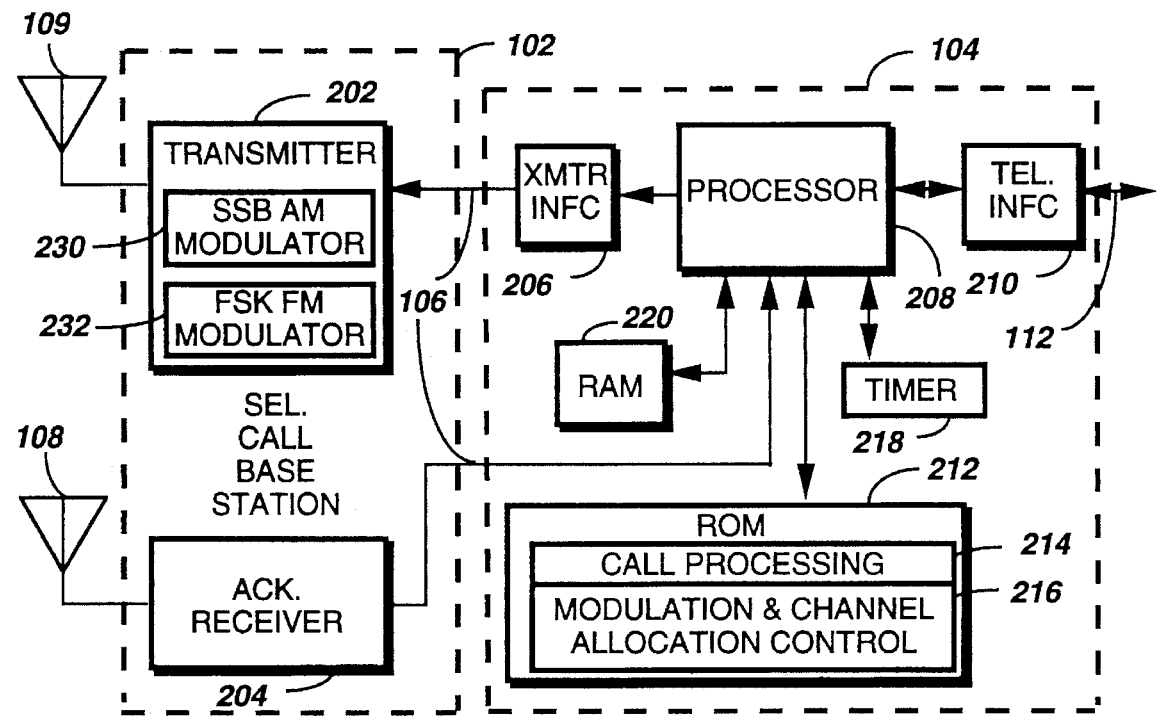
FIG. 2 is an electrical block diagram of portions of a controller and base station in accordance with the preferred embodiment of the present invention.

Referring to FIG. 2, an electrical block diagram 200 comprises portions of the controller 104 and the selective call base station 102 in accordance with the preferred embodiment of the present invention. The controller 104 comprises a processor 208 for directing operation of the controller 104. The processor 208 preferably incorporates conventional digital-to-analog (D/A) and analog-to-digital converters (not shown) for converting the voice messages between digital and analog formats, as required for processing and transmission, respectively. The processor 208 preferably is coupled through a conventional transmitter interface 206 to a conventional transmitter 202 having a four-level FSK FM modulator 232 for sending the control information. The transmitter 202 also includes a SSB AM modulator for sending the voice messages. The processor 208 is also coupled to at least one conventional binary FSK acknowledgment receiver 204. The at least one acknowledgment receiver 204 can be collocated with the selective call base station 102, as implied in FIG. 2, but preferably is positioned remote from the selective call base station 102 to avoid interference from the transmitter 202. The at least one acknowledgment receiver 204 is for receiving one or more acknowledgments from the one of the selective call transceivers 110 in response to the control information. The acknowledgment receiver 204 is also utilized, in a manner well known in the art, for determining in which coverage zone the selective call transceiver 110 sending an acknowledgment is located, so that the voice message for the selective call transceiver 110 can be targeted to the coverage zone.

The processor 208 also is preferably coupled to the telephonic links 112 and thence to the PSTN 116 by a telephone interface 210 for receiving therefrom a selective call origination comprising identification of a called party and a voice message intended for the selective call transceiver 110 corresponding to the called party. In addition, the processor 208 is coupled to a random access memory (RAM) 220 for storing the voice message after the voice message has been digitized and compressed by the processor 208. The processor 208 also is coupled to a read-only memory (ROM) 212 comprising a call processing element 214 for use by the processor 208 in accepting and delivering the voice message. The ROM 212 also includes a modulation and channel control element 216 in accordance with the preferred embodiment of the present invention. The processor 208 also is coupled to a conventional timer 218 for controlling the timing of the TDM transmissions throughout the system.

It will be appreciated that other types of memory, e.g., electrically erasable ROM (EEROM) or magnetic disk memory, can be utilized as well for the ROM 212. It will be further appreciated that the RAM 220 and the ROM 212, singly or in combination, can be integrated as a contiguous portion of the processor 208. Preferably, the processor 208 is similar to the DSP56100 digital signal processor (DSP) manufactured by Motorola, Inc. of Schaumburg, Ill. It will be appreciated that other similar processors can be utilized as well for the processor 208, and that additional processors can be added as required to handle the processing requirements of the controller 104.

Figure 3:
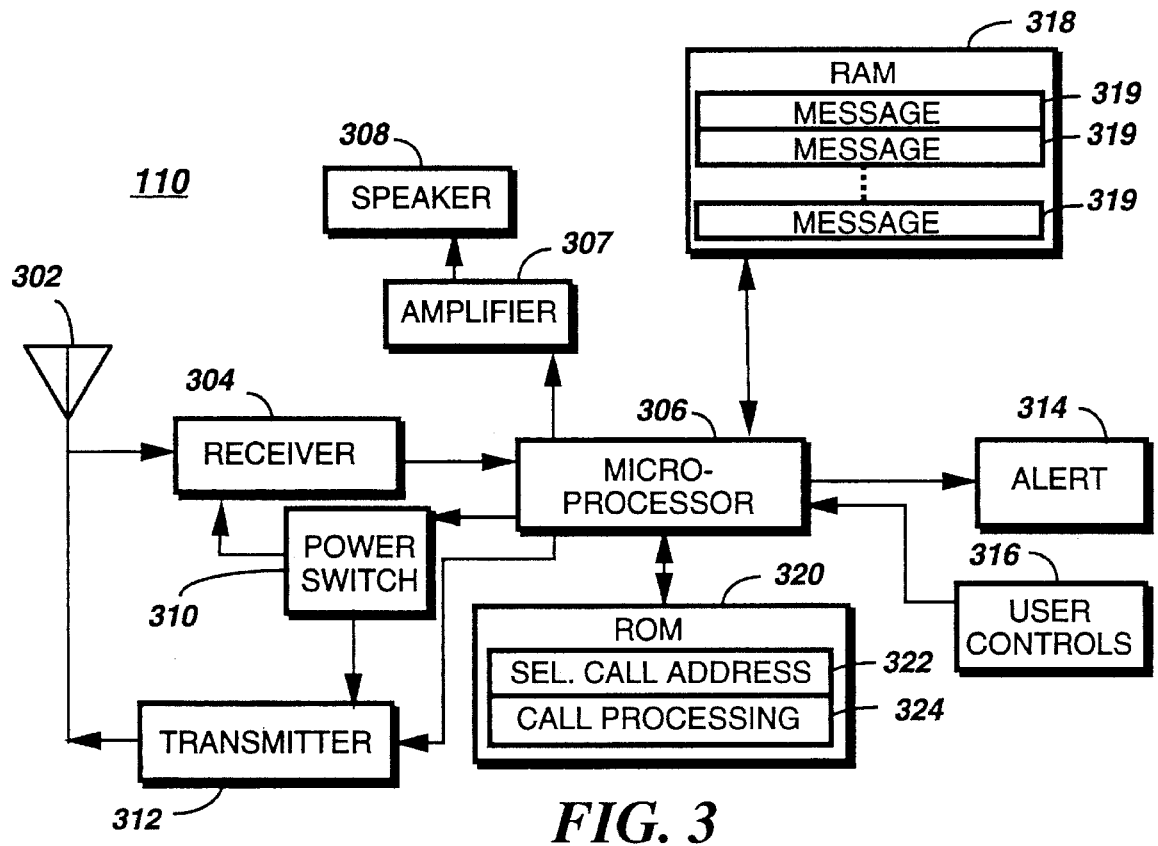
FIG. 3 is an electrical block diagram of a selective call transceiver in accordance with the preferred embodiment of the present invention.

Referring to FIG. 3, an electrical block diagram of the selective call transceiver 110 in accordance with the preferred embodiment of the present invention comprises an antenna 302 for intercepting the transmitted radio signals, which are coupled to the input of a conventional four-level FSK FM and analog SSB AM receiver 304. The radio signals are preferably selective call (paging) signals which provide, for example, a receiver address and an associated voice message. It has been empirically determined that the conventional four-level FSK FM and analog SSB AM receiver 304 exhibits a slightly better (about 4 dB better) sensitivity when receiving the FSK FM control information than the receiver exhibits when receiving the SSB AM voice messages.

The receiver 304 processes the radio signals and produces at the output demodulated information. The demodulated information is coupled into the input of a microprocessor 306, which processes the information in a manner well known in the art. Preferably, the microprocessor 306 incorporates conventional analog-to-digital (A/D) and digital-to-analog converters (not shown) for digitizing the analog voice message from the receiver 304 and for reproducing the analog voice message for audible playback. A transmitter 312 is coupled to the antenna 302 and to the microprocessor 306 for sending an acknowledgment in response to receiving control information intended for the selective call transceiver 110. The transmitter 312 is preferably a conventional binary FSK transmitter operating at a symbol rate of eight-hundred bps. It will be appreciated that other modulation techniques and symbol rates can be used as well for the transmitter 312.

A conventional power switch 310, coupled to the microprocessor 306, is used to control the supply of power to the receiver 304, thereby providing a battery saving function, and to the transmitter 312 for controlling power thereto. When a selective call address is received by the microprocessor 306, the received address is compared with one or more selective call addresses 322 stored in a ROM 320, and when a match is detected, a call alerting signal is generated to alert a user that a message is pending. The ROM 320 also includes a call processing element 324 for processing the received messages. It will be appreciated that other types of memory, e.g., electrically erasable ROM (EEROM), can be utilized as well for the ROM 320. The call alerting signal is directed to a conventional audible or tactile call alerting device 314 for generating an audible or tactile call alerting signal. Conventional user controls 316 allow a user of the selective call transceiver 110 to, among other things, select between the audible call alerting signal and the tactile call alerting signal in a manner well known in the art.

The voice message which is subsequently received is digitized in a conventional manner and then is stored in a message location 319 of a pager random access memory (RAM) 318, and can be accessed by the user for audible playback using the user controls 316, which provide such additional functions as lock, unlock, delete, etc. More specifically, by the use of appropriate functions provided by the user controls 316, the message is recovered from the RAM 318, and then decompressed and converted to analog by the microprocessor 306 for audible playback through a conventional speaker 308 after being amplified by a conventional audio amplifier 307.

The microprocessor 306 preferably is similar to the DSP56100 digital signal processor (DSP) manufactured by Motorola, Inc. of Schaumburg, Ill. It will be appreciated that other similar DSPs can be utilized as well for the microprocessor 306, and that additional microprocessors, e.g., the MC68HC05 series microcomputer, manufactured by Motorola, Inc. of Schaumburg, Ill., can be utilized also, as required to handle the processing requirements of the selective call transceiver 110. It will be appreciated that the RAM 318 and the ROM 320 also can be included as a portion of the microprocessor 306. It will be further appreciated that other types of memory, e.g., electrically erasable programmable read-only memory (EEPROM) or flash memory can be utilized as well for the RAM 318.

Figure 4:
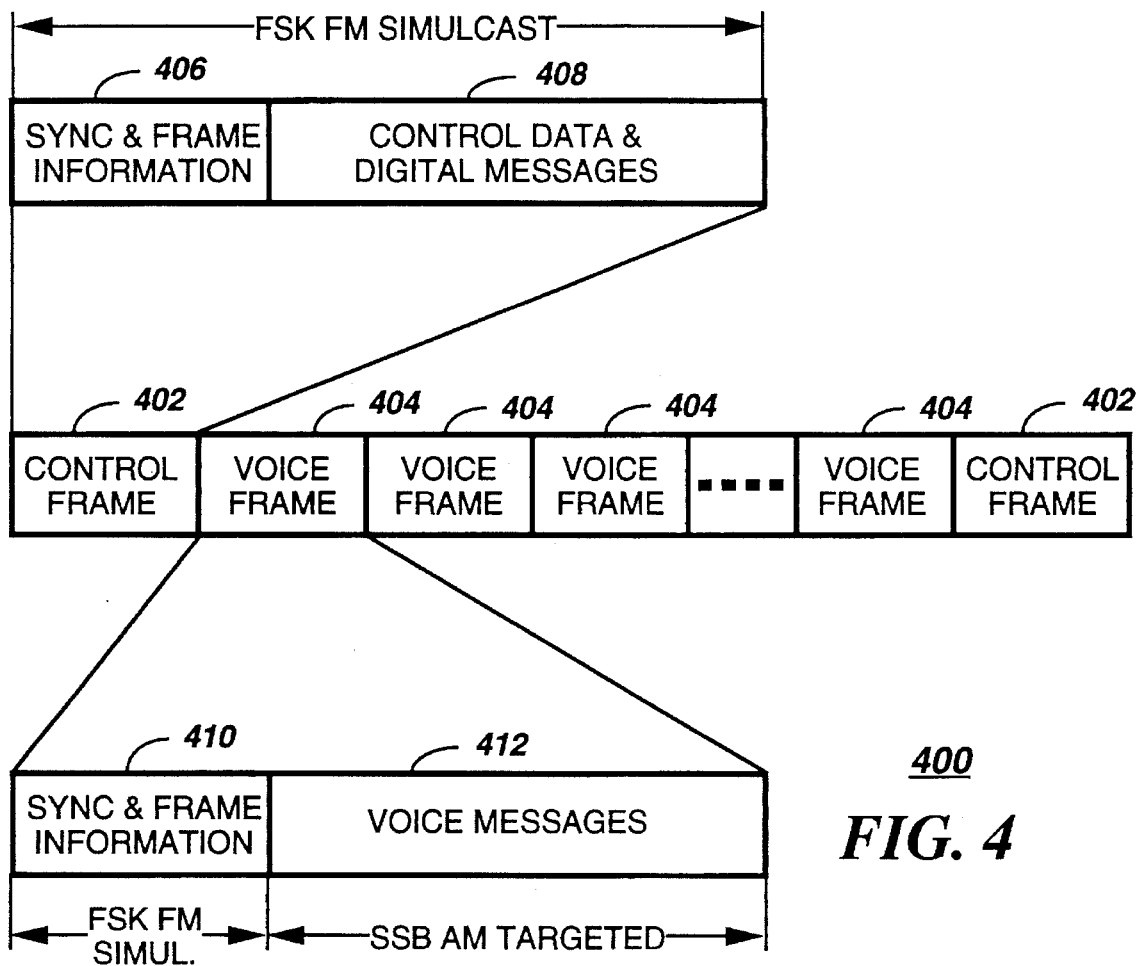
FIG. 4 is a timing diagram depicting portions of an outbound communication protocol in accordance with the preferred embodiment of the present invention.

Referring to FIG. 4, a timing diagram 400 depicts portions of the outbound communication protocol in accordance with the preferred embodiment of the present invention. The timing diagram 400 depicts a control frame 402, followed by a plurality of voice frames 404 before another control frame 402 begins a next cycle. The control frame 402 comprises synchronization bits and frame information, such as the type of frame (control or voice) and the frame number. The control frame 402 further comprises control data and digital messages 408, such as forward and reverse channel frequencies and speeds, and time of day. Preferably, the control frame 402 is transmitted in simulcast from the transmitters throughout the coverage area utilizing FSK FM modulation techniques.

Each voice frame 404 comprises synchronization and frame information 410 similar to that of the control frame 402. This information preferably is also transmitted in simulcast from the transmitters throughout the coverage area utilizing FSK FM modulation techniques. The voice frame 404 further comprises voice messages 412, which are transmitted utilizing SSB AM modulation techniques. Preferably, the voice messages 412 are targeted to coverage zones within the coverage area, thereby permitting frequency re-use for other voice messages 412 in other coverage zones. Thus, while all the voice messages of the system are transmitted simultaneously during the second portion 412 of the voice frames 404, different messages preferably are transmitted in different ones of the coverage zones throughout the coverage area, permitting the frequency re-use.

Figure 5:
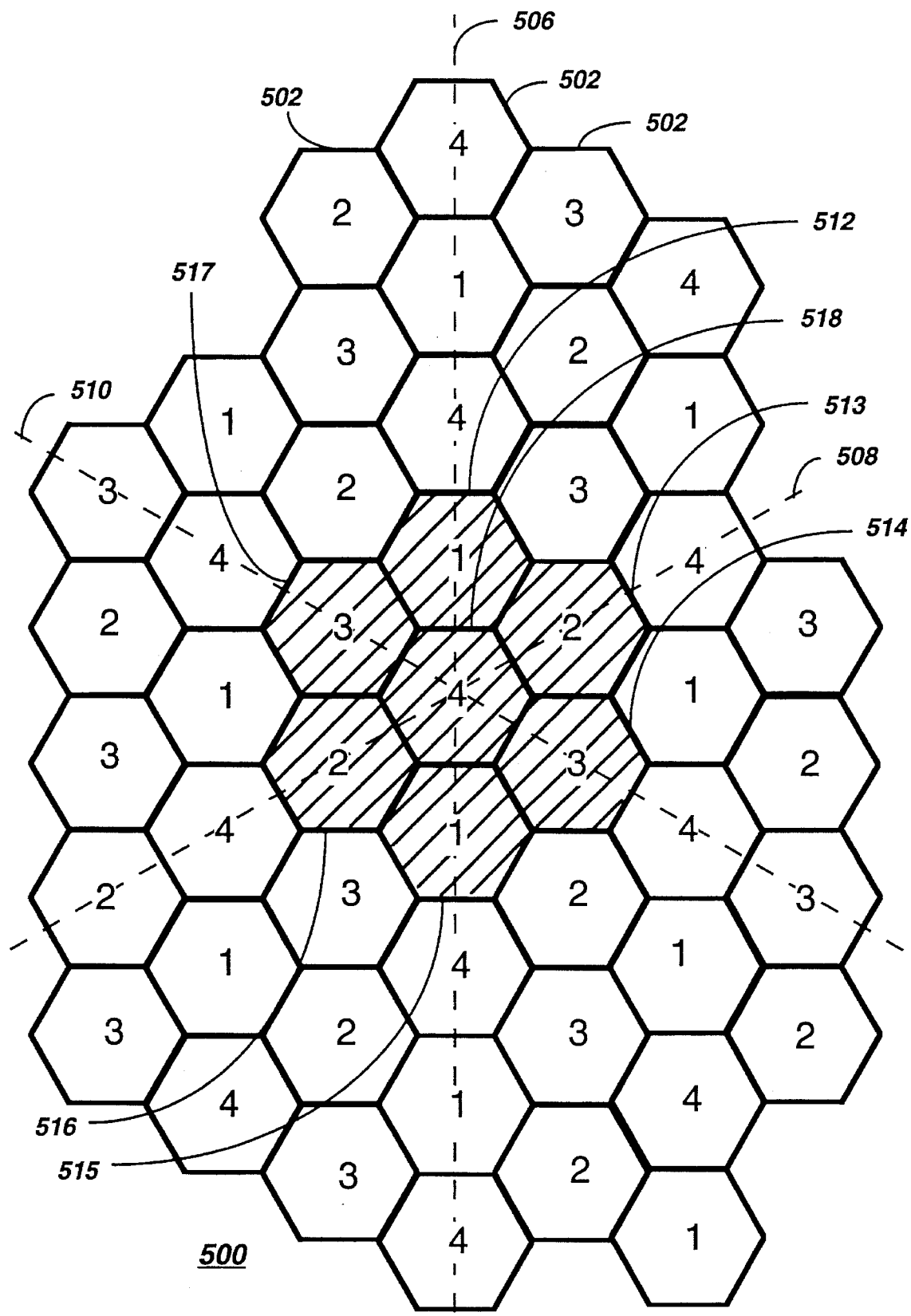
FIG. 5 is a diagram of a coverage area divided into coverage zones, depicting allocation of control channels in accordance with the preferred embodiment of the present invention.

Referring to FIG. 5, a diagram of the coverage area 500 divided into coverage zones 502 depicts allocation of control channels in accordance with the preferred embodiment of the present invention. First, a discussion of why there is a need to allocate the control channels seems appropriate. Because it is preferred to transmit the control information in simulcast throughout the coverage area, the amount of control channel traffic increases in proportion to the number of selective call transceivers 110 served in the coverage area. As the control traffic increases, a point is reached at which more than one control channel is needed to handle the traffic. While it is possible to transmit multiple control channels within a coverage zone, it is not desirable due to transmitter bandwidth requirements and/or the cost of additional transmitters.

In making the present invention, the inventor recognized that, because of the different modulation techniques utilized, the usable coverage distance from the transmitter would be greater for the control information than for the voice messages. For example, the FSK FM modulation technique preferably utilized for the control information exhibits an average output power equal to the peak output power of the transmitter. On the other hand, the SSB AM technique preferably utilized for the voice messages exhibits an average output power 8 dB less than the peak output power of the transmitter. These differences, combined with the 4 dB greater sensitivity of the selective call transceivers 110 to the FSK FM transmissions (discussed above) produce a 12 dB overall link gain advantage for the control information compared to the voice messages. The 12 dB link gain advantage translates to twice the coverage distance (four times the area of coverage) for the control information as compared to the voice message information.

Recognizing that with four times the area of coverage, the control channels should need only one-fourth as many transmitter sites as are required for the voice channels, the inventor then devised the four-channel assignment pattern depicted in FIG. 5. In FIG. 5, the coverage area 500 has been divided into equal size hexagonal coverage zones 502, each hexagon representing the voice channel coverage expected from a single transmitter centered therein. The numbers 1–4 identify one of four control channels assigned to each of the coverage zones 502.

The assignment plan is started by selecting a starting cluster 512–518 of seven of the hexagons (shaded in FIG. 5) that includes a central hexagon 518 and six outer hexagons 512–517 contiguous with sides of the central hexagon 518. The six additional hexagons form first, second, and third opposing pairs 512 and 515, 513 and 516, 514 and 517 of hexagons located on opposite sides of the central hexagon. First, second, and third control channels are then assigned to the coverage zones represented by the first, second, and third opposing pairs 512 and 515, 513 and 516, 514 and 517 of hexagons, respectively. A fourth control channel is assigned to the coverage zone represented by the central hexagon 518, thereby completing the four-channel assignment pattern for the starting cluster 512–518. Next, the four-channel assignment pattern is repeated throughout the coverage area 500 by placing additional assignment clusters identical to the starting cluster 512–518 around the starting cluster 512–518 and thence around each other until all the coverage zones 502 have been assigned a control channel. To continue the assignment process, the central hexagons (i.e., those that have been assigned to control channel 4 in FIG. 5) of the additional assignment clusters are centered on first, second, and third straight lines 506, 508, 510 that bisect the first, second, and third opposing pairs 512 and 515, 513 and 516, 514 and 517 of hexagons, respectively, and wherein the central hexagons of adjacent assignment clusters are separated by a single outer hexagon common to both of the adjacent assignment clusters. For example, the central hexagon of the cluster adjacent to and to the left of the starting cluster 512–518 and centered on the line 510 is separated from the central hexagon 518 of the starting cluster 512–518 by the outer hexagon 517 common to both clusters.

Figure 6:
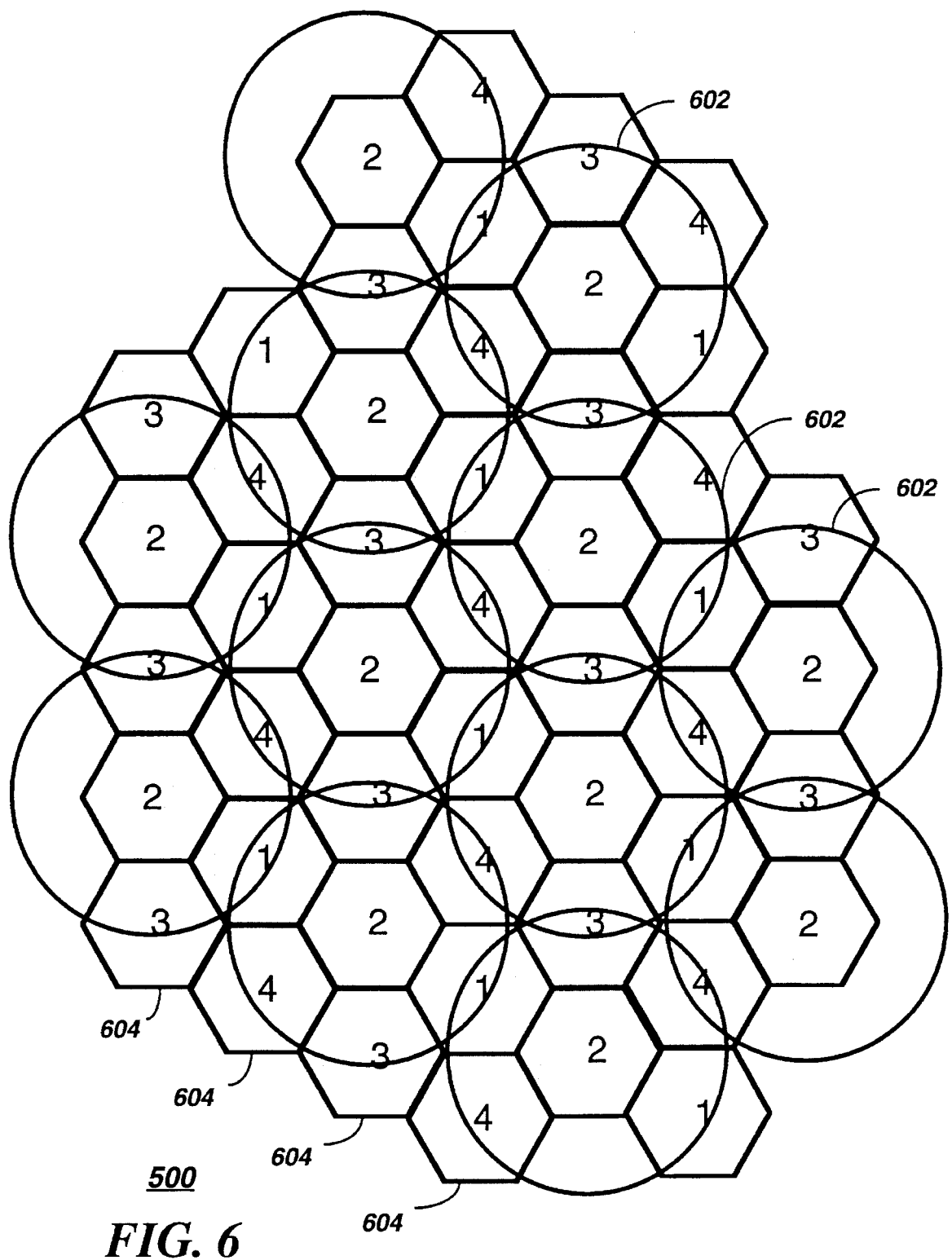
FIG. 6 is a diagram of the coverage area, depicting control channel coverage in accordance with the preferred embodiment of the present invention.

Referring to FIG. 6, a diagram of the coverage area 500 depicts control channel coverage in accordance with the preferred embodiment of the present invention. To simplify the diagram, only the coverage of control channel #2 is shown. The control channel #2 coverage is depicted by the circles 602, which are drawn to represent a coverage distance double that of the voice channels. Note that the control channel coverage in the middle portion of the coverage area 500 is universal. There is some lack of coverage at the periphery, such as in the coverage zones 604. If necessary, additional transmitters 202 or directional antennas can be used to provide universal coverage for such peripheral coverage zones. Diagrams similar to FIG. 6 that address the coverage of the other three control channels demonstrate similar coverage patterns for the other three control channels. Thus, except for some peripheral coverage zones, the coverage area 500 advantageously receives universal coverage from all four control channels while requiring the transmission of only a single control channel from each of the transmitters 202.

Figure 7:
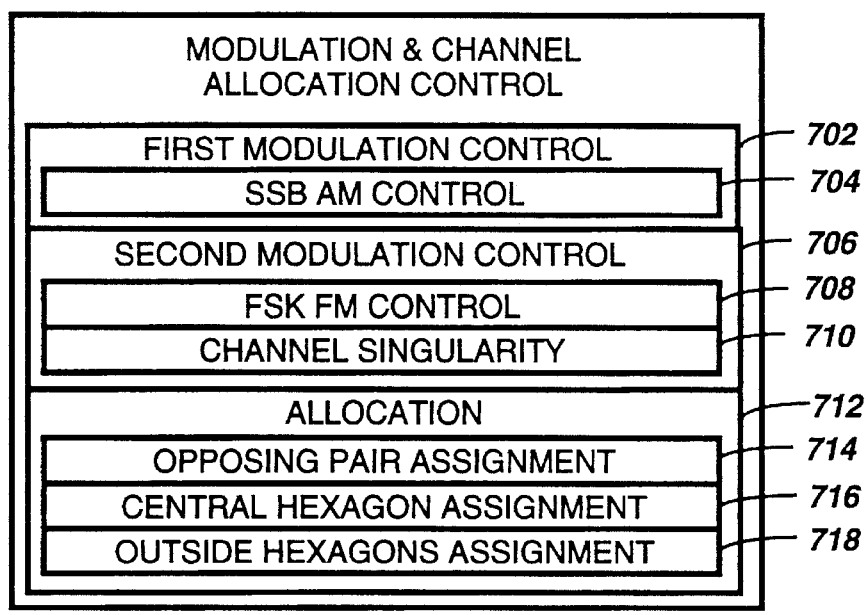
FIG. 7 is a firmware diagram depicting firmware of the controller in accordance with the preferred embodiment of the present invention.

Referring to FIG. 7, a firmware diagram depicts the modulation and channel allocation control element (MCAC) 216 of the controller 104 in accordance with the preferred embodiment of the present invention. The MCAC 216 comprises a first modulation control element 702 including a single sideband amplitude modulation control element 704 for controlling at least one of the transmitters 202 to transmit a voice message on the message channel as a SSB AM signal. The MCAC 216 further comprises a second modulation control element 706 including a frequency shift keyed frequency modulation control element 708 for controlling the transmitters 202 to transmit the control signals on the control channels as FSK modulated signals. The second modulation control element 706 also includes a channel singularity element 710 for controlling the transmitters 202 to transmit a single control channel per transmitter 202.

The MCAC 216 also includes an allocation element 712 for allocating the control channels to the coverage zones in a staggered geographic pattern such that reception of the control channels is maintained substantially throughout the coverage area 500. The allocation element 712 comprises an opposing pair assignment element 714 for assigning first, second, and third control channels to the coverage zones 502 represented by the first, second, and third opposing pairs 512 and 515, 513 and 516, 514 and 517 of hexagons, respectively. The allocation element 712 further comprises central hexagon assignment element 716 for assigning a fourth control channel to the coverage zone 502 represented by the central hexagon 518, thereby completing the four-channel assignment pattern for the starting cluster 512–518. The allocation element 712 also includes an outside hexagons assignment element 718 for repeating the four-channel assignment pattern throughout the coverage area 500 by placing additional assignment clusters identical to the starting cluster 512–518 around the starting cluster 512–518 and thence around each other until all the coverage zones 502 have been assigned a control channel, wherein the central hexagons of the additional assignment clusters are centered on the first, second, and third straight lines 506, 508, 510 that bisect the first, second, and third opposing pairs 512 and 515, 513 and 516, 514 and 517 of hexagons, respectively, and wherein the central hexagons of adjacent assignment clusters are separated by a single outer hexagon common to both of the adjacent assignment clusters.

Figure 8:
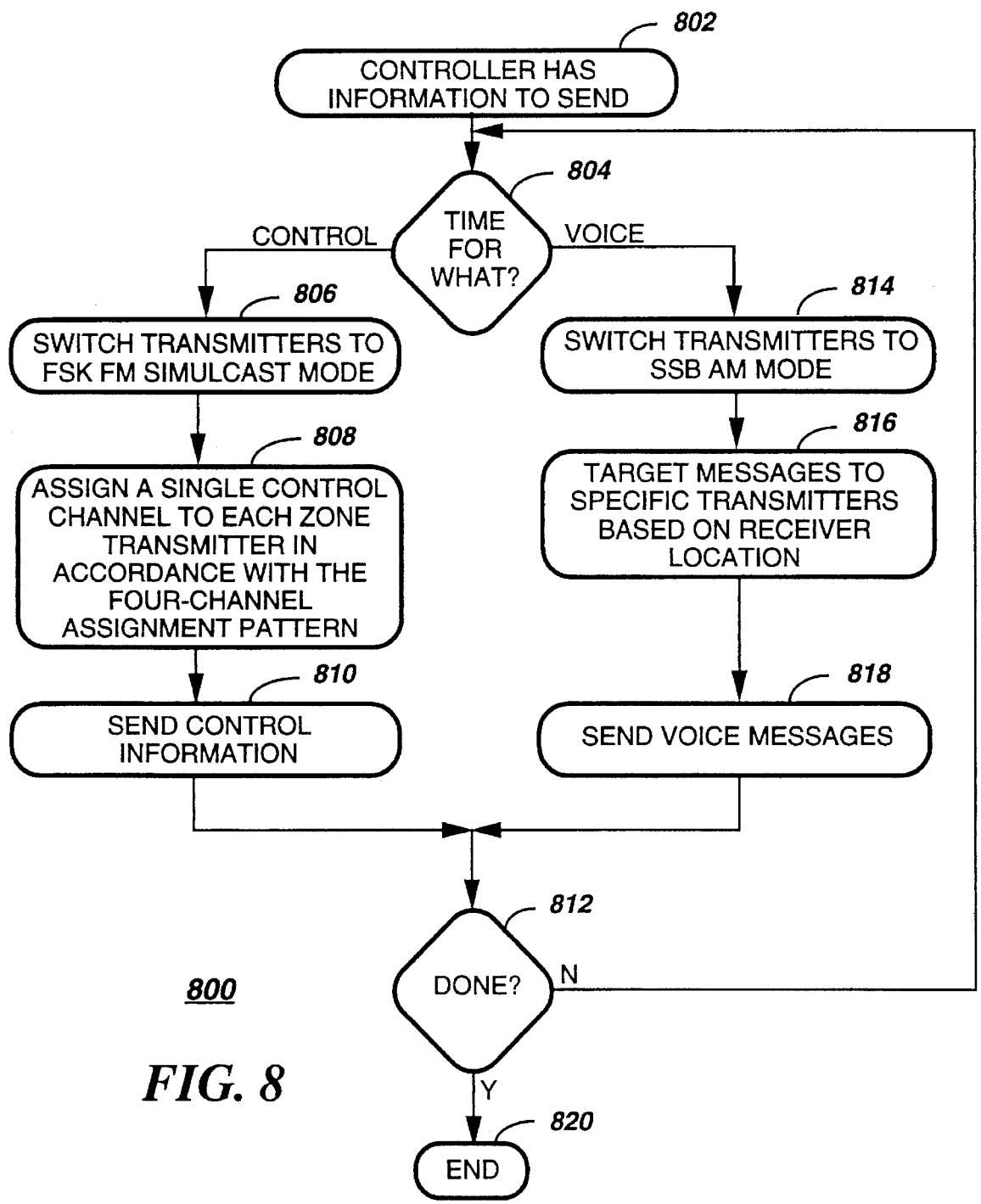
FIG. 8 is a flow chart depicting operation of the radio communication system in accordance with the preferred embodiment of the present invention.

Referring to FIG. 8, a flow chart 800 depicts operation of the radio communication system in accordance with the preferred embodiment of the present invention. The flow begins with the controller 104 having 802 information to send. In response the processor 208 checks the timer 218 to determine 804 whether it is time for transmission of control information or voice messages. If it is time for control information, the processor 208 accesses the second modulation control element 706 and switches 806 the transmitters 202 to the FSK FM simulcast mode. Then the processor 208 accesses the allocation element 712 to assign 808 a single channel to each transmitter 202 of a coverage zone 502 in accordance with the four-channel assignment pattern depicted in FIG. 5. Then the processor 208 controls the transmitters 202 to send 810 the control information for the duration of the control frame 402. The processor 208 then checks 812 whether all the information has been sent. If not, the flow returns to step 804.

If in step 804 it is time for a voice message transmission, the processor 208 accesses the first modulation control element 702 and switches 814 the transmitters 202 to the SSB AM mode. The processor 208 then targets 816 selected voice messages to specific transmitters 202 based upon the locations of the selective call transceivers 110 for which the voice messages are intended. The locations of the selective call transceivers 110 preferably are determined from acknowledgment responses to the control information in a manner well known in the art. The processor 208 then controls the transmitters 202 to send 818 the voice messages for the duration of the voice frame 404. The processor 208 then again checks 812 whether all the information has been sent. If not, the flow returns to step 804. If all the information has been sent, the process ends 820.

Thus it should be apparent by now that the present invention provides a cost effective method and apparatus for simulcasting the control information on multiple channels throughout the coverage area without requiring the multiple control channels to be transmitted from every coverage zone transmitter. Advantageously, with the possible exception of some peripheral zones, the method and apparatus does not require any additional transmitters beyond those already required for sending the voice messages.

What is claimed is:

1. A method in a radio communication system comprising a plurality of portable receivers, the method for providing a plurality of control channels that are transmitted in simulcast from a plurality of transmitters in a coverage area and for providing a plurality of message channels that are transmitted in coverage zones within the coverage area, wherein each coverage zone is covered by a transmitter having a peak output power, and wherein the control channels and the message channels are transmitted within the coverage area on a synchronized time-division multiplex (TDM) basis, and wherein the plurality of control channels exceed a transmission capacity of a single transmitter, the method comprising the steps of:

(a) employing a first modulation technique to generate each of the message channels at a first average output power that is substantially less than the peak output power of the transmitter;

(b) employing a second modulation technique to generate each of the control channels at a second average output power approximately equal to the peak output power of the transmitter, thereby increasing usable coverage distance from the transmitter for the control channel compared to the usable coverage distance achieved for the message channel; and (c) allocating the plurality of control channels to the coverage zones in a staggered geographic pattern such that reception of the plurality of control channels is maintained substantially throughout the coverage area.

2. The method of claim 1, further comprising the step of selecting the first and second modulation techniques such that a reception sensitivity achieved by the portable receivers with the second modulation technique is superior to the reception sensitivity achieved with the first modulation technique, thereby further increasing the usable coverage distance for the control channel.

3. The method of claim 1, wherein step (a) comprises the step of transmitting a voice message on the message channel as a single-sideband (SSB) amplitude modulated (AM) signal, and wherein step (b) Comprises the step of transmitting a control signal on the control channel as a frequency shift keyed (FSK) frequency modulated (FM) signal.

4. The method of claim 1, wherein step (b) comprises the step of transmitting a single control channel per transmitter.

5. The method of claim 1, wherein step (a) comprises the step of transmitting a voice message on the message channel as a single-sideband (SSB) amplitude modulated (AM) signal, and wherein step (b) comprises the step of transmitting a data message on the control channel as a frequency shift keyed (FSK) frequency modulated (FM) signal, a single control channel transmitted per transmitter, and wherein, in response to the transmitter operating at the peak output power during transmission of both the control channel and the message channel, cumulative resultant link gains achieve substantially doubled usable coverage distance from the transmitter for the control channel compared to the usable coverage distance achieved for the message channel.

6. The method of claim 1, wherein the coverage zones are represented as a plurality of contiguous, equal size hexagons extending throughout the coverage area, each hexagon having the transmitter of the coverage zone centered therein, and wherein a starting cluster of seven of the hexagons is selected that includes a central hexagon and six outer hexagons contiguous with sides of the central hexagon, the six outer hexagons forming first, second, and third opposing pairs of hexagons located on opposite sides of the central hexagon, and wherein step (c) comprises the steps of:

assigning first, second, and third control channels to the coverage zones represented by the first, second, and third opposing pairs of hexagons, respectively;

assigning a fourth control channel to the coverage zone represented by the central hexagon, thereby completing a four-channel assignment pattern; and repeating the four-channel assignment pattern throughout the coverage area by placing additional assignment clusters identical to the starting cluster around the starting cluster and thence around each other until all the coverage zones have been assigned a control channel, wherein the central hexagons of the additional assignment clusters are centered on first, second, and third straight lines that bisect the first, second, and third opposing pairs of hexagons, respectively, and wherein the central hexagons of adjacent assignment clusters are separated by a single outer hexagon common to both of the adjacent assignment clusters.

7. A controller in a radio communication system comprising a plurality of portable receivers, the controller for providing a plurality of control channels that are transmitted in simulcast from a plurality of transmitters in a coverage area and for providing a plurality of message channels that are transmitted in coverage zones within the coverage area, wherein each coverage zone is covered by a transmitter having a peak output power, and wherein the control channels and the message channels are transmitted within the coverage area on a synchronized time-division multiplex (TDM) basis, and wherein the plurality of control channels exceed a transmission capacity of a single transmitter, the controller comprising:

a processor for controlling operation of the controller;

a telephone interface coupled to the processor for accepting messages intended for the portable receivers;

a transmitter interface coupled to the processor for communicating with the plurality of transmitters to transmit control signals for the portable receivers on the control channels and to transmit the messages for the portable receivers on the message channels;

a first modulation control element coupled to the processor for controlling the plurality of transmitters to employ a first modulation technique to generate each of the message channels at a first average output power that is substantially less than the peak output power of the transmitter;

a second modulation control element coupled to the processor for controlling the plurality of transmitters to employ a second modulation technique to generate each of the control channels at a second average output power approximately equal to the peak output power of the transmitter, thereby increasing usable coverage distance from the transmitter for the control channel compared to the usable coverage distance achieved for the message channel; and an allocation element coupled to the processor for allocating the plurality of control channels to the coverage zones in a staggered geographic pattern such that reception of the plurality of control channels is maintained substantially throughout the coverage area.

8. The controller of claim 7, wherein the first modulation control element comprises a single sideband (SSB) amplitude modulation (AM) control element coupled to the processor for controlling at least one of the plurality of transmitters to transmit a voice message on the message channel as a SSB AM signal, and wherein the second modulation control element comprises a frequency shift keyed (FSK) frequency modulation (FM) control element coupled to the processor for controlling the plurality of transmitters to transmit the control signals on the control channels as FSK modulated signals.

9. The controller of claim 7, wherein the second modulation control element comprises a channel singularity element coupled to the processor for controlling the plurality of transmitters to transmit a single control channel per transmitter.

10. The controller of claim 7, wherein the first modulation control element comprises a single sideband (SSB) amplitude modulation (AM) control element coupled to the processor for controlling at least one of the plurality of transmitters to transmit a voice message on the message channel as a SSB AM signal, and wherein the second modulation control element comprises:
  a frequency shift keyed (FSK) frequency modulation (FM) control element coupled to the processor for controlling the plurality of transmitters to transmit the control signals on the control channels as FSK modulated signals; and
  a channel singularity element coupled to the processor for controlling the plurality of transmitters to transmit a single control channel per transmitter, and wherein, in response to the transmitter operating at the peak output power during transmission of both the control channel and the message channel, cumulative resultant link gains achieve substantially doubled usable coverage distance from the transmitter for the control channel compared to the usable coverage distance achieved for the message channel.

11. The controller of claim 7, wherein the coverage zones are represented as a plurality of contiguous, equal size hexagons extending throughout the coverage area, each hexagon having the transmitter of the coverage zone centered therein, and wherein a starting cluster of seven of the hexagons is selected that includes a central hexagon and six outer hexagons contiguous with sides of the central hexagon, the six outer hexagons forming first, second, and third opposing pairs of hexagons located on opposite sides of the central hexagon, and wherein the allocation element comprises:
  an opposing pair assignment element coupled to the processor for assigning first, second, and third control channels to the coverage zones represented by the first, second, and third opposing pairs of hexagons, respectively;
  a central hexagon assignment element coupled to the processor for assigning a fourth control channel to the coverage zone represented by the central hexagon, thereby completing a four-channel assignment pattern; and
  an outer hexagons assignment element coupled to the processor for repeating the four-channel assignment pattern throughout the coverage area by placing additional assignment clusters identical to the starting cluster around the starting cluster and thence around each other until all the coverage zones have been assigned a control channel, wherein the central hexagons of the additional assignment clusters are centered on first, second, and third straight lines that bisect the first, second, and third opposing pairs of hexagons, respectively, and wherein the central hexagons of adjacent assignment clusters are separated by a single outer hexagon common to both of the adjacent assignment clusters.

12. Apparatus in a radio communication system comprising a plurality of portable receivers, the apparatus for providing a plurality of control channels that are transmitted in simulcast from a plurality of transmitters in a coverage area and for providing a plurality of message channels that are transmitted in coverage zones within the coverage area, wherein each coverage zone is covered by a transmitter having a peak output power, and wherein the control channels and the message channels are transmitted within the coverage area on a synchronized time-division multiplex (TDM) basis, and wherein the plurality of control channels exceed a transmission capacity of a single transmitter, the apparatus comprising:

processor means for controlling operation of the apparatus;

telephone interface means coupled to the processor means for accepting messages intended for the portable receivers;

transmitter interface means coupled to the processor means for communicating with the plurality of transmitters to transmit control signals for the portable receivers on the control channels and to transmit the messages for the portable receivers on the message channels;

first modulation control means coupled to the processor means for controlling the plurality of transmitters to employ a first modulation technique to generate each of the message channels at a first average output power that is substantially less than the peak output power of the transmitter;

second modulation control means coupled to the processor means for controlling the plurality of transmitters to employ a second modulation technique to generate each of the control channels at a second average output power approximately equal to the peak output power of the transmitter, thereby increasing usable coverage distance from the transmitter for the control channel compared to the usable coverage distance achieved for the message channel; and allocation means coupled to the processor means for allocating the plurality of control channels to the coverage zones in a staggered geographic pattern such that reception of the plurality of control channels is maintained substantially throughout the coverage area.

13. The apparatus of claim 12, wherein the first modulation control means comprises a single sideband (SSB) amplitude modulation (AM) control means coupled to the processor means for controlling at least one of the plurality of transmitters to transmit a voice message on the message channel as a SSB AM signal, and wherein the second modulation control means comprises a frequency shift keyed (FSK) frequency modulation (FM) control means coupled to the processor means for controlling the plurality of transmitters to transmit the control signals on the control channels as FSK modulated signals.

14. The apparatus of claim 12, wherein the second modulation control means comprises a channel singularity means coupled to the processor means for controlling the plurality of transmitters to transmit a single control channel per transmitter.

15. The apparatus of claim 12, wherein the first modulation control means comprises a single sideband (SSB) amplitude modulation (AM) control means coupled to the processor means for controlling at least one of the plurality of transmitters to transmit a voice message on the message channel as a SSB AM signal, and wherein the second modulation control means comprises:
  a frequency shift keyed (FSK) frequency modulation (FM) control means coupled to the processor means for controlling the plurality of transmitters to transmit the control signals on the control channels as FSK modulated signals; and
  a channel singularity means coupled to the processor means for controlling the plurality of transmitters to transmit a single control channel per transmitter, and wherein, in response to the transmitter operating at the peak output power during transmission of both the control channel and the message channel, cumulative resultant link gains achieve substantially doubled usable coverage distance from the transmitter for the control channel compared to the usable coverage distance achieved for the message channel.

16. The apparatus of claim 12, wherein the coverage zones are represented as a plurality of contiguous, equal size hexagons extending throughout the coverage area, each hexagon having the transmitter of the coverage zone centered therein, and wherein a starting cluster of seven of the hexagons is selected that includes a central hexagon and six outer hexagons contiguous with sides of the central hexagon, the six outer hexagons forming first, second, and third opposing pairs of hexagons located on opposite sides of the central hexagon, and wherein the allocation means comprises:

an opposing pair assignment means coupled to the processor means for assigning first, second, and third control channels to the coverage zones represented by the first, second, and third opposing pairs of hexagons, respectively;

a central hexagon assignment means coupled to the processor means for assigning a fourth control channel to the coverage zone represented by the central hexagon, thereby completing a four-channel assignment pattern; and an outside hexagons assignment means coupled to the processor means for repeating the four-channel assignment pattern throughout the coverage area by placing additional assignment clusters identical to the starting cluster around the starting cluster and thence around each other until all the coverage zones have been assigned a control channel, wherein the central hexagons of the additional assignment clusters are centered on first, second, and third straight lines that bisect the first, second, and third opposing pairs of hexagons, respectively, and wherein the central hexagons of adjacent assignment clusters are separated by a single outer hexagon common to both of the adjacent assignment clusters.

* * * * *